(12) United States Patent
Bahjat et al.

(10) Patent No.: US 9,189,686 B2
(45) Date of Patent: Nov. 17, 2015

(54) APPARATUS AND METHOD FOR IRIS IMAGE ANALYSIS

(71) Applicants: Ahmed Abdullah Bahjat, University Park, PA (US); Lahouari Ghouti, University Park, PA (US)

(72) Inventors: Ahmed Abdullah Bahjat, University Park, PA (US); Lahouari Ghouti, University Park, PA (US)

(73) Assignee: King Fahd University of Petroleum and Minerals, Dhahran (SA)

( * ) Notice: Subject to any disclaimer, the term of this patent is extended or adjusted under 35 U.S.C. 154(b) by 143 days.

(21) Appl. No.: 14/139,227

(22) Filed: Dec. 23, 2013

(65) Prior Publication Data

US 2015/0178547 A1 Jun. 25, 2015

(51) Int. Cl.
*G06K 9/00* (2006.01)
(52) U.S. Cl.
CPC .......... *G06K 9/0061* (2013.01); *G06K 9/00617* (2013.01)
(58) Field of Classification Search
None
See application file for complete search history.

(56) References Cited

U.S. PATENT DOCUMENTS

| 8,285,005 B2 | 10/2012 | Hamza |
| 8,345,936 B2 | 1/2013 | Burge et al. |
| 8,411,910 B2 | 4/2013 | Savvides et al. |
| 2010/0202669 A1 | 8/2010 | Hollingsworth et al. |

OTHER PUBLICATIONS

Mayank Vasta, et al., "Improving Iris Recognition Performance Using Segmentation, Quality Enhancement, Match Score Fusion, and Indexing", IEEE Transactions on Systems, Man, and Cybernetics—Part B Cybernetics, 2008, pp. 1-15.

Ahmed A. Bahjat, "Multibiometric Systems: Novel Schemes for Information Fusion", King Fahd University of Petroleum & Minerals, Dhahran 31261, Saudi Arabia, Jun. 2009 (124 pages).

*Primary Examiner* — Mark Roz
(74) *Attorney, Agent, or Firm* — Oblon, McClelland, Maier & Neustadt, L.L.P.

(57) ABSTRACT

An apparatus including circuitry configured to receive a plurality of images and extract at least one iris image from each of the plurality of images. The circuitry is configured to receive a claimed identity iris image corresponding to an identity to be authenticated, normalize the iris images and the claimed identity iris image, and filter the normalized extracted iris images to select a subset of the normalized extracted iris images based on a similarity measurement relative to the normalized claimed identity iris image. The circuitry is configured to divide the normalized claimed identity iris image and each image of the subset of images into a plurality of sub-images, filter the sub-images to select the sub-image having a closest similarity measurement relative to a sub-image of the normalized claimed identity image in a corresponding sub-image position to the selected sub-image, and generate a composite iris image by fusing the selected sub-images.

17 Claims, 12 Drawing Sheets

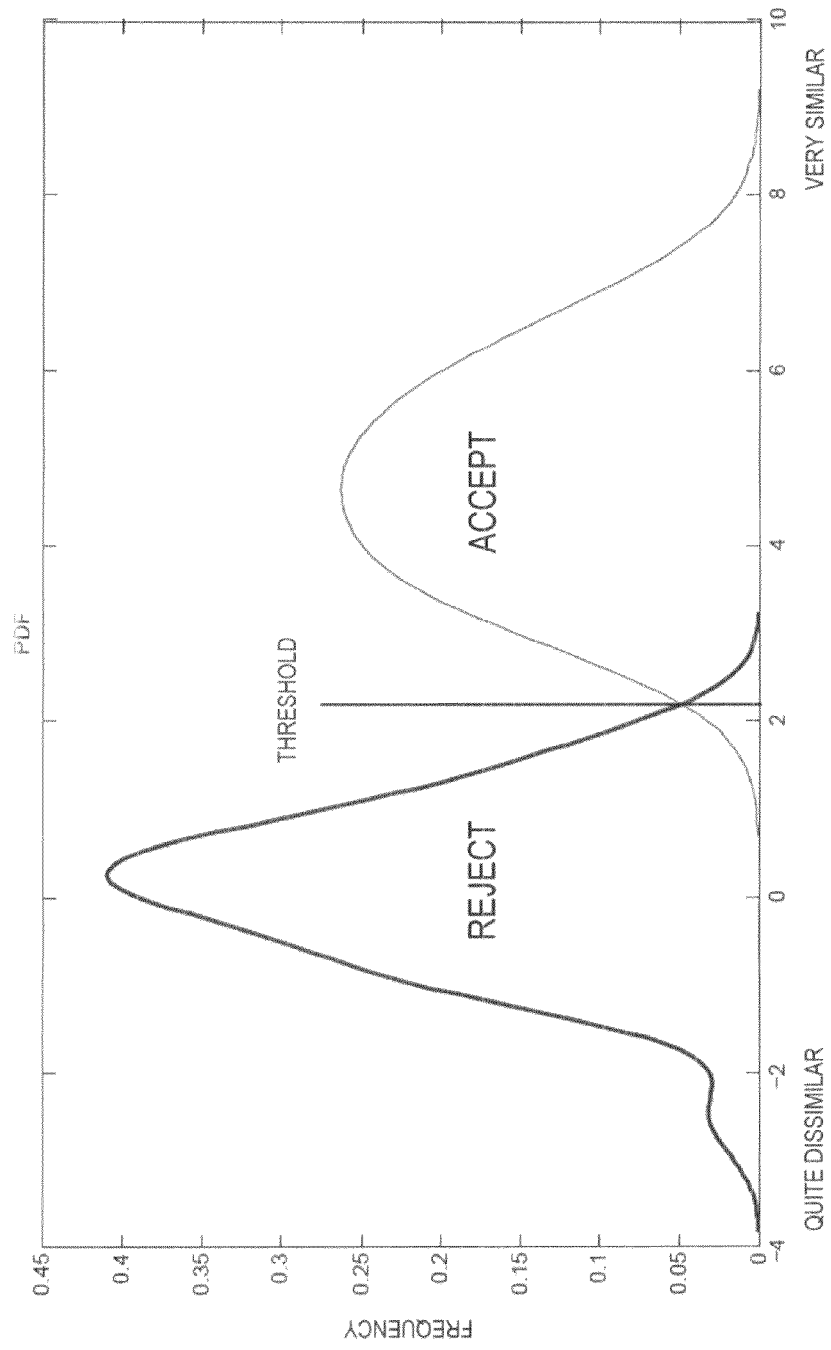

APPARATUS AND METHOD FOR IRIS IMAGE ANALYSIS

BACKGROUND

Technical Field

The present disclosure relates to identification systems based on biometrics.

REFERENCES

[1]. R. Brunelli and D. Falavigna. Person Identification Using Multiple Cues. IEEE Transactions on Pattern Analysis and Machine Intelligence, 17(10):955-966, October 1995.

[2]. Ross and A. K. Jain. Information Fusion in Biometrics. Pattern Recognition Letters, 24(13):2115-2125, September 2003.

[3]. Ross, K. Nandakumar, and A. K. Jain. Handbook of Multibiometrics. Springer, 2006.

[4]. The Freedonia Group, Inc. Biometric & Other Electronic Access Control Systems to 2009—Demand and Sales Forecasts, Market Share, Market Size, Market Leaders. <http://www.freedoniagroup.com/Biometric-And-Other-Electronic-Access-Control-Systems.html>. 14 Oct. 2013.

[5]. R. Snelick, U. Uludag, A. Mink, M. Indovina, and A. K. Jain. Large Scale Evaluation of Multimodal Biometric Authentication Using State-of-the-Art Systems. IEEE Transactions on Pattern Analysis and Machine Intelligence, 27(3): 450-455, March 2005.

[6]. B. Ulery, A. R. Hicklin, C. Watson, W. Fellner, and P. Hallinan. Studies of Biometric Fusion. Technical Report IR 7346, NIST, September 2006.

[7]. J. Daugman, "Biometric personal identification system based on iris analysis," U.S. Pat. No. 5,291,560, March 1994.

[8]. R. P. Wildes, Iris recognition: an emerging biometrics technology, Proc. IEEE, vol. 85, no. 9, pp. 1348-1363, September 1997.

[9]. R. W. Ives, A. J. Guidry, and D. M. Etter, "Iris recognition using histogram analysis," Thirty-Eighth Asilomar Conference on Signals, Systems, and Computers, pp. 562-566, 2005.

[10]. M. K. Khan, J. Zhang, and S-J. Hong, "An effective iris recognition system for identification of humans," 8th International Multitopic Conference, pp. 114-117, 2004.

[11]. J.-G. Ko, Y.-H. Gil, and J.-H. Yoo, "Iris Recognition using Cumulative SUM based Change Analysis," International Symposium on Intelligent Signal, 2006.

[12]. N. Sudha, N. B. Puhan, X. Hua, and J. Xudong, "Iris recognition on edge maps," 6th International Information, Communications & Signal Processing, 2007.

[13]. V. Conti, G. Milici, F. Sorbello, and S. Vitabile, "A Novel Iris Recognition System based on Micro-Features," IEEE Workshop on Automatic Identification Advanced Technologies, pp. 253-258, 2007.

[14]. W. Anna, C. Yu, W. Jie, and Zhangxinhua, "Iris Recognition Based on Wavelet Transform and Neural Network," IEEE/ICME International Conference on Complex Medical Engineering, 2007.

[15]. K. Miyazawa, K. Ito, T. Aoki, K. Kobayashi, and H. Nakajima, "An Effective Approach for Iris Recognition Using Phase-Based Image Matching," IEEE Transaction of Pattern Analysis and Machine Intelligence, vol. 30, no. 10, pp. 1741-1756, 2008.

[16]. J. Daugman, "High confidence visual recognition of persons by a test of statistical independence," IEEE Trans. on Pattern Anal. Machine Intell., vol. 15, pp. 1148-1161, 1993.

[17]. J. Daugman, "Statistical richness of visual phase information: update on recognizing persons by iris patterns," Internat. J. on Comp. Vision, vol. 45, pp. 25-38, 2001.

[18]. J. Daugman, "Demodulation by complex-valued wavelets for stochastic pattern recognition," Internat. J. on Wavelets, Multi-Res. and Info. Processing, vol. 1, no. 1, pp. 1-17, 2003.

[19]. M. Turner, "Texture discrimination by Gabor functions," Bioi. Cybern., vol. 55, pp. 71-82, 1986.

[20]. G. V. Wouwer, P. Scheunders, and D. V. Dyck, "Statistical texture characterization from discrete wavelet representations," IEEE Trans. Image Processing, vol. 8, pp. 592-598, April 1999.

[21]. N. Vasconcelos and A. Lippman, "Embedded mixture modeling for efficient probabilistic content-based indexing and retrieval," SPIE Multimedia Storage and Archiving Systems III, 1998.

[22]. M. N. Do and M. Vetterli, "Wavelet-based texture retrieval using generalized Gaussian density and Kullback-Leibler distance," IEEE Trans. Image Process. vol. 11, no. 2, pp. 146-158, February 2002.

[23]. D. Maltoni, D. Maio, A. K. Jain, and S. Prabhakar, Handbook of Fingerprint Recognition. New York: Springer, 2003.

[24]. Gray, A. "The Intuitive Idea of Distance on a Surface." §15.1 in Modern Differential Geometry of Curves and Surfaces with Mathematica, 2nd ed. Boca Raton, Fla.: CRC Press, pp. 341-345, 1997.

[25]. L. Masek, "Recognition of Human Iris Patterns for Biometric Identification", MSc Thesis, The University of Western Australia, Australia, 2003.

DESCRIPTION OF RELATED ART

Biometric systems refer to recognition systems used for the identification of individuals based on feature vectors derived from their physiological and/or behavioral characteristics. Biometric systems are gradually replacing the conventional methods of individual identification/authentication. Unlike the conventional methods that are typically based on the personal knowledge (i.e., what the person "knows," such as a personal identification number and/or password) and physical proof of identification (i.e., what the person carries, such as an identification card), biometric systems are based on the personal physiological and/or behavioral traits (i.e., who the person is).

Typical biometric systems are generally based on an analysis of, e.g., an individual's facial features, voice, hand geometry, handwriting, signature, retina, iris, and fingerprints [1]. Biometric systems may work by first capturing a feature sample, such as recording a digital sound signal for voice recognition, or capturing the face details into a digital color image for facial recognition. Other biometric traits may be used in a similar fashion using different capture devices. Then, the acquired biometric samples may be objectively compared with other templates and/or samples for identification, matching and recognition purposes.

Most biometric systems are operated in two different operational modes. The first mode (enrollment) allows the enrollment (i.e., addition) of new biometric templates to a new or existing database. In the second operational mode (identification), a template is created for an individual and then possible matching templates are searched for in the populated biometric databases [2].

In recent years, the need for reliable user authentication techniques has been rapidly increasing. In the United States of America, the demand for such systems experienced growth of 10.4% in 2009. Such substantial growth has been mainly driven by technological innovations, falling prices and relatively high crime rates [3]. Biometrics systems and smart cards are expected to have the main share of the market growth [3, 4]. The air transportation business is expected to attract the largest investments, and to be the subject of the highest market growth [4].

Biometric systems are found in real world in three major areas. First, as an authentication subsystem in commercial applications such as computer network login, electronic data security, e-commerce, Internet access, automated teller machines (ATM) or credit card use, physical access control, mobile phone, personal digital assistant (PDA), medical records management, distance learning, etc. Second, as national identification system for managing group of peoples in government applications such as managing inmates in a correctional facility, driver's licenses, social security, welfare-disbursement, border control, passport control and identification, etc. Third, as a forensic tool for corpse identification, criminal investigation parenthood determination, etc.

SUMMARY

Information fusion has been recognized as an important component in the design and implementation of multi-biometric systems. Recently, improved matching and recognition performance have been reported in literature for multi-biometric systems. Information fusion plays a major role in such systems. In fact, for multi-biometric systems, information fusion can be viewed as a scheme to improve the quality of the biometric trait sample for more accurate matching performance and reduced false accept/reject rates. It is worth noting that the application of information fusion encompasses several stages in multi-biometric systems ranging from raw samples acquisition to matching decision processing, such as accepting or rejecting access for individuals based on aspects of acquired biometric data. The present disclosure focuses on the inclusion of the information fusion solution at the sample and pre-feature levels. In particular, the present disclosure proposes efficient fusion for fusing iris images based on a statistical modeling of normalized iris images applied at the pre-feature level. As will be demonstrated, a multi-biometric system according to aspects of the present disclosure yield enhanced performance relative to traditional biometric systems.

According to one embodiment, an apparatus includes circuitry configured to receive a plurality of images and extract at least one iris image from each of the plurality of images. The circuitry is configured to receive a claimed identity iris image corresponding to an identity to be authenticated, normalize the iris images and the claimed identity iris image, and filter the normalized extracted iris images to select a subset of the normalized extracted iris images based on a similarity measurement relative to the normalized claimed identity iris image. The circuitry is configured to divide the normalized claimed identity iris image and each image of the subset of images into a plurality of sub-images, filter the sub-images to select the sub-image having a closest similarity measurement relative to a sub-image of the normalized claimed identity image in a corresponding sub-image position to the selected sub-image, and generate a composite iris image by fusing the selected sub-images.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4 illustrates a graph of exemplary error distributions, and a selection of a threshold values based on the distributions according to one aspect of the present disclosure;

DETAILED DESCRIPTION

Figure 1:
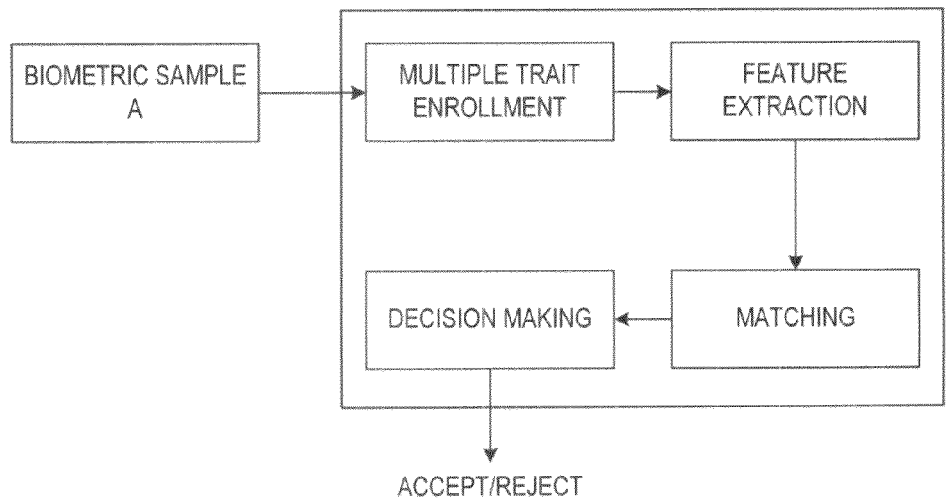
FIGS. 1 and 2 illustrate differences between uni-biometric and multi-biometric systems.

Referring now to the drawings, wherein like reference numerals designate identical or corresponding parts throughout the several views.

As discussed previously, biometric systems are becoming one of the fastest-growing personal identification systems due to their high precision and accuracy in identifying individuals based on their physiological and/or behavioral characteristic, which overcome the limitations of token-based and knowledge-based identification systems. Biometrics is classified into two main groups: (1) physiological and (2) behavioral. The former group is based on the person's behavioral traits such as gait, voice, keystrokes, and signature. The latter group relies on the person's physiological traits. These traits may, e.g., include aspects of facial features, fingerprints, iris features, retina features, hand geometry, palm-prints and DNA. Moreover, biometric systems are considered as pattern recognition systems that process such traits to identify the person based on a prior knowledge of his specific biometric data. While the behavior group does have merit and could be used in conjunction with the physiological group, the present disclosure mainly focuses on physiological biometric systems because they enjoy fewer limitations than their counterparts; they ensure uniqueness of individuals; pattern recognition algorithms provide simple, yet efficient, feature representations; and they provide wider application opportunities (e.g., physical access such as airport security and border control, logical access such as e-banking, and social benefits).

Uni-biometric systems (i.e., biometric systems based on single source of evidence) are widely deployed and used for border control, restricted access of privileged information, secured online banking systems, social insurance programs, and so on. However, uni-biometric systems have several limitations that hinder their effectiveness and make them less reliable in identification and authentication applications. In particular, uni-biometric systems may suffer from poor accuracy due to noisy sensor data, non-universality, inter-class similarity, and lack of invariant representation. Scalability is also an issue with uni-biometric systems—if the number of data samples, N, is large, identification becomes an issue. Additionally, uni-biometric systems may suffer from security and privacy concerns, as spooling can take place in many physiological traits such as fingerprint, signature, and voice.

In response to the limitations of uni-biometric systems, multi-biometric systems have been recently introduced to improve identification and recognition performance. Multi-biometric systems rely on multiple sources of evidence (i.e., biometric samples) when performing identification and/or recognition processing, rather than single source of evidence used in uni-biometric systems [3]. By integrating multiple biometric samples or multiple traits, more efficient and reliable systems can be devised.

Information fusion may be utilized to achieve the integration of the multiple biometric traits/samples at different stages of multi-biometric systems [5, 6]. It should be noted that the resulting systems may be either be hybrid or simple systems depending on the type of information fusion strategy being adopted and applied.

Figure 2:
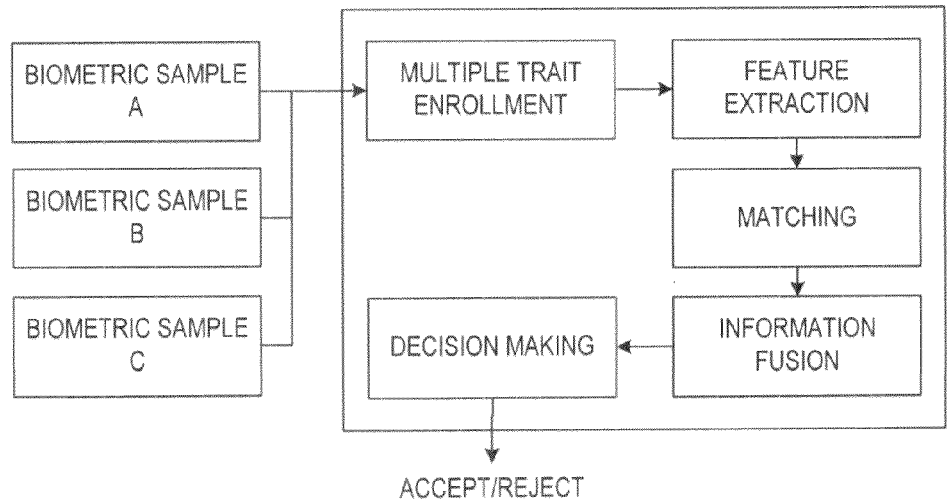

FIGS. 1 and 2 illustrate some of the major differences between uni-biometric and multi-biometric systems. The exemplary uni-biometric system of FIG. 1 receives a single biometric sample A as input. In certain aspects of the present disclosure, biometric sample A may be one of a fingerprint, voice data, signature data, an iris image, or other biometric data.

Referring now to FIG. 2, in contrast to the uni-biometric system of FIG. 1, the multi-biometric system of FIG. 2 receives a plurality of biometric sample inputs A, B and C. The biometric sample inputs may respectively be one of any of the exemplary biometric data types discussed herein and/or understood by the skilled artisan. The integration of several biometric samples and/or traits may be made possible by the incorporation of the information fusion module into the multi-biometric system of FIG. 2, which highlights the importance of this module in the successful development of multi-biometric systems, since uni-modal could be considered in an ensemble but without allowing possibly an improved matching and recognition performance.

Multibiometric system can be designed using different modalities or same modalities but multiplicity of other factors. Multibiometric systems with different modalities may include independent systems of biometrics such as iris recognition systems and fingerprint recognition systems combined together at the decision stage to derive a conclusion about an identity. However, in multibiometric systems with single modality there can be four different techniques. First, a single trait system such as an iris recognition system built using multiple sensors of the same modality (e.g., two different brands of iris sensors). Second, building a single modality using multiple units of the same individual such as left and right irises of the same individual. Third, single trait but multiple representations models using different algorithms to represent the row data to the recognition system such as minutiae-based and texture based representation of a fingerprint. In the fourth technique, a multibiometric system may include a single recognition system that takes multiple snapshots of a single trait, such as multiple snapshots of an iris. The present disclosure is focused on building a multibiometric system using the last technique; multiple snapshot of an iris. However, systems and methods described herein may be adapted to include aspects of other techniques.

Furthermore, information fusion takes place in multibiometric system at any stage of recognition. In more detail, information fusion can be implemented at enrollment level where the raw data such as images of multiple evidence mixed together to produce a new image to be processed as an identity claim. In other systems, information fusion is implemented at the feature extraction level, where two normalized images are used to extract a unique feature matrix of an identity. Similarly, the process of information fusion could be delayed until the matching score level where the score of each individual process is normalized to facilitate a unified process of conclusion at the decision stage. Lastly, each process could work independently to reach a decision about an identity and then we use a voting mechanism such as majority voting to combine their decision to conclude a single decision.

In summary, the main advantages of multi-biometric systems are: improved accuracy; they address the issue of non-universality problem; they provide flexibility to the user; they reduce the effect of noisy data; they provide the capability to search a large database in computationally efficient manner; they are resistant to spoof attacks; and they are fault tolerant systems. Each of the aforementioned features mitigates one or some of the limitations found in uni-biometric systems.

As discussed above, biometric systems based on a single source of information (uni-modal systems) are known to suffer from several limitations, and may not be able to achieve the desired performance requirements of real-world applications. In contrast, multi-biometric systems combine information from multiple sources in order to arrive at a more reliable decision in terms of matching and rejection rates [3].

The present disclosure describes aspects of a multi-biometric system for analyzing iris data, whereby information fusion is carried out at the pre-feature level, as it will be explained in detail later in this disclosure. In certain aspects of the present disclosure, the system utilizes pattern matching and recognition algorithms such as the Daugman algorithm [7].

Iris recognition has become a popular research topic in recent years. Due to its reliability and accuracy of recognition, it is used in the highly-secured areas like border control, airport customs, etc. An iris recognition system may include three stages of processing: image preprocessing, feature extraction, and template matching. Specific aspects of iris recognition processing according to aspects of the present disclosure will be discussed in detail in later paragraphs.

Wildes [8] gives accounts of the main reasons behind the use of iris images as a trusted and highly reliable human trait for discriminating individuals. Until the past few years, several new algorithms for iris feature extraction have been proposed. However, very little contributions have been made to propose new matching mechanisms in order to improve the accuracy of iris recognition systems at large. For instance, Ives et al. [9] show that histogram analysis can be used instead of Daugman algorithm [10] for feature extraction of human iris. An algorithm of extracting human iris features using the wavelet transform is proposed by Khan et al. [10]. In their work, Khan et al. perform iris matching using Hamming distance (HD). Ko et al. [11] propose a new method for the extraction of the iris feature using the cumulative sum based grey change analysis. Iris edge maps have been proposed for feature extraction in [12]. It should be noted that some of the proposed approaches consider the use of specific iris minutia points where these are extracted from the iris image in analogy to what is being done in fingerprint identification/matching systems [13].

Studies have been carried out to analyze the effect of improving the classifier instead of improving the feature extraction process on the recognition accuracy of iris recognition. Anna et al. [14] adopt a Canny transform to extract features and probabilistic wavelet neural network as an iris biometric classifier. Miyazawa et al. [15] propose a new algorithm for iris matching based on phase correlation analysis. Experimentally, Miyazawa system achieves lower overhead in processing time and stored information for samples.

Mathematical Context

In this section, the mathematical and technical preliminaries important to the development of the proposed information fusion schemes are explained. Gabor wavelets are introduced. Background for the digital watermarking process is laid out, followed by the concept of statistical modeling for wavelet-based texture representations. More, specifically a detailed explanation of the Generalized Gaussian Distribution (GGD) is provided, along with algorithms for the estimation of the mode parameters. Finally, a review of biometric performance measures is given with some standard notations.

Gabor Wavelet Transforms

Wavelets are used to decompose data in the biometric region (iris, fingerprint, face, etc.) into components that appear at different resolutions. A set of wavelet filters may be applied to the biometric at each resolution in order to provide a compact and discriminating representation of the pattern. A Gabor filter may be constructed by modulating a sine/cosine wave with Gaussian. This allows providing the optimum conjoint localization both in space and frequency, since a sine wave is perfectly localized in frequency, but not localized in space. The decomposition of a signal may be accomplished by using a quadrature pair of Gabor filters, with a real part specified by a cosine modulated by a Gaussian, and an imaginary part specified by a sine modulated by Gaussian. The real and imaginary filters are also known as the even symmetric and odd symmetric components, respectively. The center frequency may be specified by the frequency of the sine/cosine wave, and the bandwidth of the filter may be specified by the width of the Gaussian.

As an application of Gabor wavelets, Daugman used a 2D version of Gabor filters in order to encode iris pattern data. A 2D Gabor filter over an image domain (x,y) is represented as [16]:

$$G(x,y)=e^{-\pi[(x-x_0)^2/\alpha^2+(y-y_0)^2/\beta^2]}e^{-2\pi i[u_0(x-x_0)+v_0(y-y_0)]}$$

where $(x_0, y_0)$ specifies position in the image, $(\alpha, \beta)$ denotes the effective width and length, and $(u_0, v_0)$ indicates modulation, which has spatial frequency [17]:

$$w_0=(u_0^2+v_0^2)^{1/2}$$

Daugman used polar coordinates for normalization and in polar form the filters are given as [18]:

$$H(r,\theta)=e^{-w(\theta-\theta_0)}e^{-(r-r_0)^2/\alpha^2}e^{-i(\theta-\theta_0)^2/\beta^2}$$

where $(\alpha, \beta)$ are the same as above and $(r_0, \theta_0)$ specify the center frequency of the filter. The demodulation and phase quantization process can be represented as:

$$h_{\{Re,Im\}}=\text{sgn}_{\{Re,Im\}}\int_\rho \int_\emptyset I(\rho,\emptyset)e^{-iw(\theta_0-\emptyset)}e^{-(r_0-\rho)^2/\alpha^2}e^{-i(\theta_0-\emptyset)^2/\beta^2}$$

where $h_{\{Re,Im\}}$ can be regarded as a complex-valued bit whose real and imaginary components are dependent on the sign of the 2D integral, and $I(\rho, \emptyset)$ is the raw input image in a dimensionless polar coordinate system.

Gabor filters are widely used in feature extraction and computer vision; however it suffers from direct current (DC) component in the even symmetric filter whenever the bandwidth is larger than one octave. This limitation can be overcome by using a special type of Gabor filter known as log-Gabor filter, which is Gaussian on a logarithmic scale. This type produces zero DC components for any bandwidth. The log-Gabor function more closely reflects the frequency response for the task of analyzing natural images and is consistent with measurement of the mammalian visual system [19].

Figure 3A:
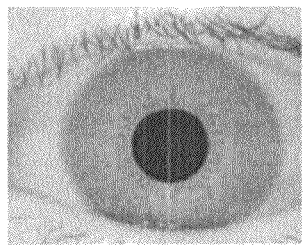
FIGS. 3A-3D illustrate an example of the decomposition of an iris image using a 2D Gabor wavelet transform at a specific scale and orientation according to one aspect of the present disclosure.
Figure 3B:
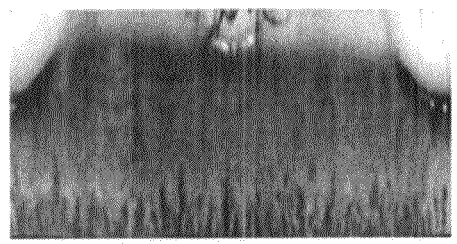
Figure 3C:
Figure 3D:
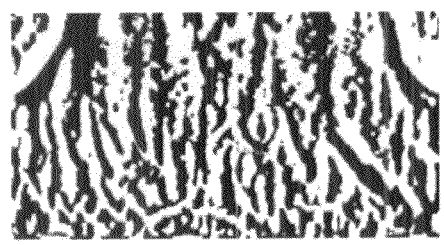

FIGS. 3A-3D show an example of the decomposition of an iris image using a 2D Gabor wavelet transform at a specific scale and orientation according to one aspect of the present disclosure. FIG. 3A illustrates an exemplary iris image sample. The normalized iris image shown in FIG. 3B has been decomposed into real and imaginary Gabor representations, as illustrated in FIGS. 3C and 3D, respectively.

Texture Modeling Using Generalized Gaussian Distributions

Statistical modeling may be implemented in content-based information retrieval (CBIR) systems, as well as in pattern recognition. Texture modeling becomes easier when the texture is represented in a statistical model using wavelet transformation. For instance, Generalized Gaussian Distributions (GGDs) may be successfully used to model coefficients produced by various types of wavelets transforms. Wouwer et al. [20] proposed a modeling scheme where texture images are represented using wavelets. In their work, model parameters were estimated using moment matching techniques. Extracted model parameters were compared used the Euclidian distance as a similarity measure. In [21], Vasconcelos and Lippman proposed a probabilistic formulation of the CBIR problem where several similarity functions were used. It should be noted that classification problems using probabilistic models usually involve two major steps [22]: (1) feature extraction, and (2) similarity measurement. In the first step, image content is fitted to a specific statistical model whose parameters are estimated using various estimation routines, and then in the second step, images based on their model parameters are ranked based on numerical or statistical similarity measures such as the Euclidian distance and Kullback Leibler distance (KLD), respectively.

The PDF of a GGD model is given by the following expression [22]:

$$f_x(x)=\alpha e^{-|\beta x|^c}$$

Both $\alpha$ and $\beta$ parameters can be expressed as a function of the so-called shaping factor c and the standard deviation $\sigma$ [22]:

$$\beta = \frac{1}{\sigma}\left(\frac{\Gamma(3/c)}{\Gamma(1/c)}\right)^{1/2}$$

$$\alpha = \frac{\beta c}{2\Gamma(1/c)}$$

where $\Gamma(\ )$ is the complete gamma function. The shaping factor c is inversely proportional to the sharpness of the PDF. Therefore, the distribution is completely specified by two parameters, c and $\sigma$. Note that the Gaussian and Laplacian distributions are special cases of the GGD distribution, given by c=2 and c=1, respectively.

By varying the two parameters of the GGD, $\alpha$ and $\beta$, a good PDF approximation may be achieved for the marginal density of coefficients at a particular sub-band produced by various types of wavelet transforms [22].

Using GGD modeling, the representation of texture images is more accurate than those using the energies of the DWT sub-band coefficients alone. Therefore, more accurate results are achieved when comparing the GGDs of two images since all the statistical interaction between the image sub-band coefficients are efficiently captured by the model parameters. Also, more reliable similarity measures are obtained using robust similarity measures such as the KLD measure described later in this disclosure.

According to certain aspects of the present disclosure, normalized iris images may be transformed in the DWT domain and modeled as textures using the GGD models. A robust technique for the estimation of the parameters of the GGD model will be considered [22]. Unlike its counterparts, Maximum-Likelihood (ML) estimator yields more accurate GGD parameters [22].

Biometric Performance Measures
Types of Errors

To assess the quality of biometric systems, we take two metrics into consideration:

False accept rate (FAR): The probability of accepting an impostor, which is basically the threshold depending fraction of the falsely accepted patterns divided by the number of all impostor patterns.

False reject rate (FRR): The probability of rejecting a genuine user, which is the fraction of the number of rejected client patterns divided by the total number of client patterns.

Additional terminology is defined below.

Operating Characteristics (ROC) Curve: Allows defining the operating point for a given FAR/FRR point.

Genuine distribution (GD): The matching score for comparing inter-class samples, i.e., same samples of the same individual are compared against each other.

Impostor distribution (ID): The matching score for comparing intra-class samples, i.e., samples of different individuals are compared against each other.

In theory, client scores (scores of patterns from persons known by the system) should always be higher than the scores of impostors. If this would be true, a single threshold that separates the two groups of scores could be used to differ between clients and impostors. Due to several reasons, this assumption is not true for real world biometric systems. In some cases, impostor patterns generate scores that are higher than the scores of some client patterns. For that reason, it is a fact that however the classification threshold is chosen, some classification errors occur. For example, the threshold may be set at a very high level such that no impostor scores will exceed this limit. As a result, no patterns are falsely accepted by the system. On the other hand, the client patterns with scores lower than the highest impostor scores are falsely rejected. In opposition to this, the threshold may be set at a low value such that no client patterns are falsely rejected. Then, on the other hand, some impostor patterns are falsely accepted. If the threshold is set somewhere between those two points, both false rejections and false acceptances occur.

In general, a trade-off between these two error types should be studied and decided on based on the application being designed. For negative recognition systems (e.g., preventing users from obtaining welfare benefits under false identities), a false accept results in rejecting a genuine request, whereas a false reject results in a falsely accepting an impostor attempt. On the other hand, in a positive recognition system (e.g., an access control system), a false accept determines the accepting of an impostor, whereas a false reject causes the mistaken rejection of a genuine user [23]. In either case, tradeoffs and risk in each scenario should be evaluated, and thresholds chosen accordingly.

FIG. 4 illustrates a graph of exemplary error distributions, and a selection of a threshold value based on the distributions.

Similarity Measures
Euclidian Distance

The distance between two points is the length of the path connecting them. In the plane, the distance between points $(x_1, y_1)$ and $(x_2, y_2)$ is given by the Pythagorean Theorem:

$$d = \sqrt{(x_2-x_1)^2 + (y_2-y_1)^2}$$

For two 3D points, the distance can be computed as follows:

$$d = \sqrt{(x_2-x_1)^2 + (y_2-y_1)^2 + (z_2-z_1)^2}$$

In general for N dimensional distance we can use the following general formula:

$$d = \sqrt{\sum_{i=1}^{n} |x_i - y_i|^2}$$

For curved or more complicated surfaces, the so-called metric can be used to compute the distance between two points by integration. When unqualified, the "distance" generally means the shortest distance between two points. For example, there are an infinite number of paths between two points on a sphere but, in general, only a single shortest path [24].

Hamming Distance

Hamming distance is used to measure the similarity between two iris patterns. This measurement may be used to recognize whether two patterns came from the same iris or not. If X and Y are two bitwise templates, and N denotes the total number of bits in the template, then the Hamming distance (HD) may be defined as the sum of exclusive-OR (XOR) between X and Y:

$$HD = \frac{1}{N} \sum_{i=1}^{N} X_i (XOR) Y_i$$

The closer the Hamming distance is to zero, the more correlation between two templates is expected. Thus, a zero HD measure means the two templates belong to the same iris and therefore indicates verification of the identity. The ideal HD measure between two impostors is around 0.5. In order to get a more accurate measurement, we may ensure that the IrisCode—a template generated from iris—is noise free. For example, in certain aspects of the present disclosure, the eyelid and eyelashes may be removed from the iris region in an acquired sample by using a mask template, which is a binary code indicating whether the bit in the template is clear or includes noise. The formula that incorporates noise masking in calculating the HD measure can be drawn as follows:

$$HD = \frac{1}{N - \sum_{j=1}^{N} Xn_j (OR) Yn_j} \sum_{j=1}^{N} X_i (XOR) Y_i \text{ (AND) } Xn_i' \text{ (AND) } Yn_i'$$

where $X_i$ and $Y_i$ are the two bit-wise templates to compare, Xn, and Yn, denote the corresponding noise masks for $X_i$ and $Y_i$, and N is the total number of bits represented by each iris pattern [25].

Kullback-Leibler Distance

In order to compute the similarity between two wavelets sub-bands, Kullback-Leibler distance (KLD) may be used. Two main parameters $\alpha$ and $\beta$ may be used to define the PDF of the Generalized Gaussian Distribution model of a texture which is a sub-image of an iris [22]:

$$D(p(X; \theta_q) \| p(X; \theta_t)) = \int p(x; \theta_q) \log \frac{p(x; \theta_q)}{p(x; \theta_t)} dx$$

The sum of KLDs between corresponding pairs of sub-bands is the similarity distance between two textures. Thus the KLD theory provides a justified way of combining distances into an overall similarity measurement, and no normalization on the extracted features is needed. If we denote $\alpha_i(j)$ and $\beta_i(j)$ as the extracted texture features from the wavelet sub-band j of the image $I_i$, then the overall distance between two images $I_1$ and $I_2$ (where $I_1$ is the query image) is the sum of all the distances across all wavelet sub-bands. This can be formulated as follows [22]:

$$D(p(.; \alpha_1, \beta_1) \| p(.; \alpha_2, \beta_2)) =$$

$$\log\left(\frac{\beta_1 \alpha_2 \Gamma\left(\frac{1}{\beta_2}\right)}{\beta_2 \alpha_1 \Gamma\left(\frac{1}{\beta_1}\right)}\right) + \left(\frac{\alpha_1}{\alpha_2}\right)^{\beta_2} \frac{\Gamma((\beta_2+1)/\beta_1)}{\Gamma(1/\beta_1)} - \frac{1}{\beta_1}$$

where β is the number of analyzed sub-bands. Thus the KLD theory provides a justified way of combining distances into an overall similarity measurement, and no normalization on the extracted features is needed. The distance function defined above is a function of three variables—the ratio of two scales and two shape parameters $\beta_1$ and $\beta_2$ [22]—and it can be formulated as follows:

$$D(I_1, I_2) = \sum_{j=1}^{B} D\left(p(.; \alpha_1^{(j)}, \beta_1^{(j)}) \| p(.; \alpha_2^{(j)}, \beta_2^{(j)})\right)$$

$$p(x; \alpha; \beta) = \frac{\beta}{2\alpha \Gamma\left(\frac{1}{\beta}\right)} e^{-\left(\frac{|x|}{\alpha}\right)^{\beta}}$$

Iris Recognition Based on Fusion of Iris Images

An approach to fuse iris images into a single normalized composite iris image using a wavelet-based texture retrieval and GGD is presented in this section. Alpha and Beta that describe the GGD becomes the feature for each sub-band.

Figure 5:
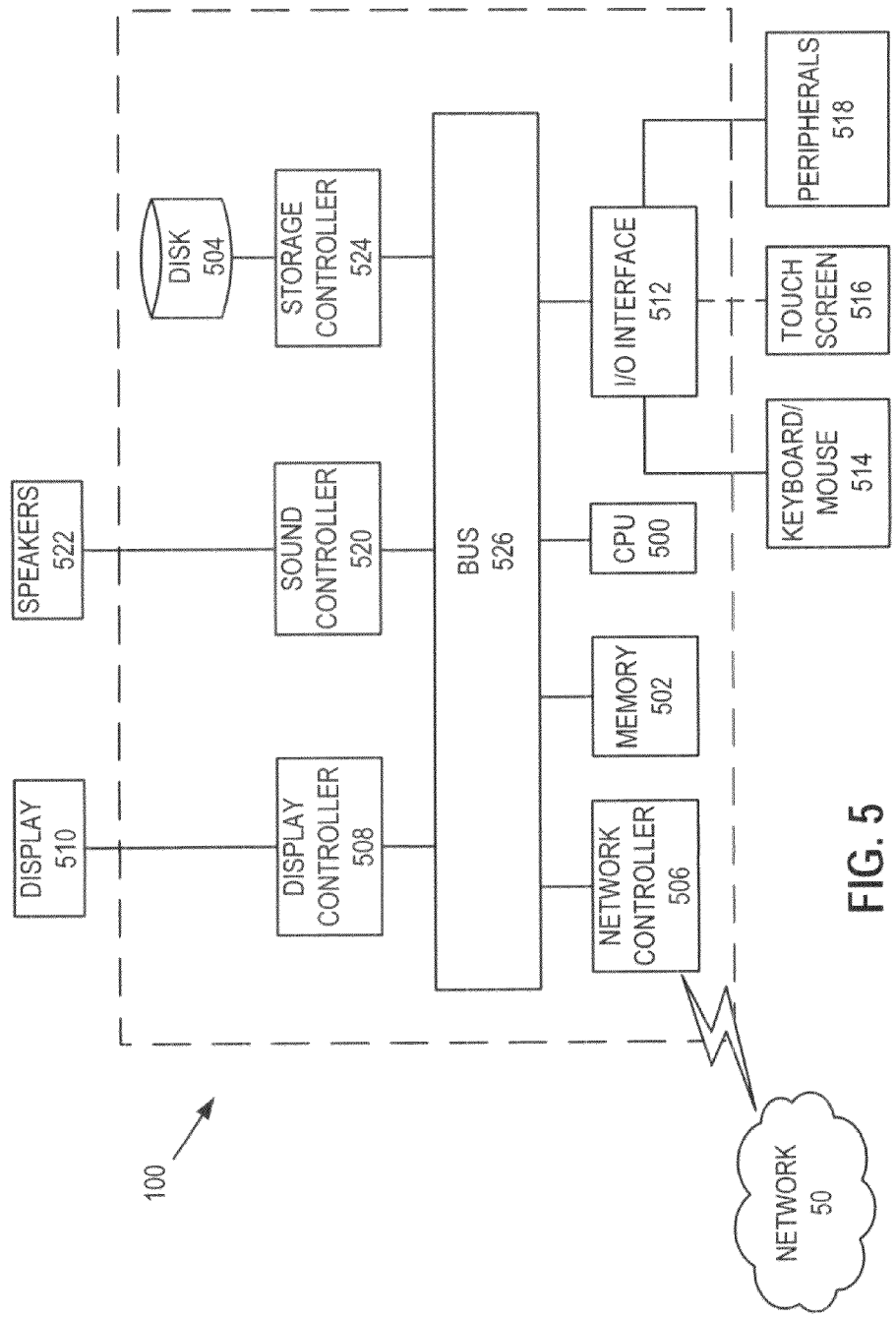
FIG. 5 illustrates a non-limiting exemplary hardware embodiment according to one aspect of the present disclosure.

FIG. 5 illustrates an exemplary hardware embodiment of an iris recognition apparatus according to aspects of the present disclosure. In FIG. 5, iris analysis device 100 includes a CPU 500 which includes circuitry that may be configured to perform the processes described herein. The process data and instructions may be stored in memory 502. These processes and instructions may also be stored on a storage medium disk 504 such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the iris analysis device 100 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The exemplary iris analysis device 100 in FIG. 5 also includes a network controller 506, such as an Intel Ethernet PRO network interface card from Intel Corporation of America, for interfacing with network 50. As can be appreciated, the network 50 can be a public network, such as the Internet, or a private network such as an LAN or WAN network, or any combination thereof and can also include PSTN or ISDN sub-networks. The network 50 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The iris analysis device 100 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard. The peripherals 518 may also include a moving and/or still image camera (e.g., a charge-coupled device or other image capturing device) to capture images, e.g., of one or more individuals' iris(es).

A sound controller 520 is also provided in the iris analysis device 100, such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the iris analysis device 100. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

Figure 6:
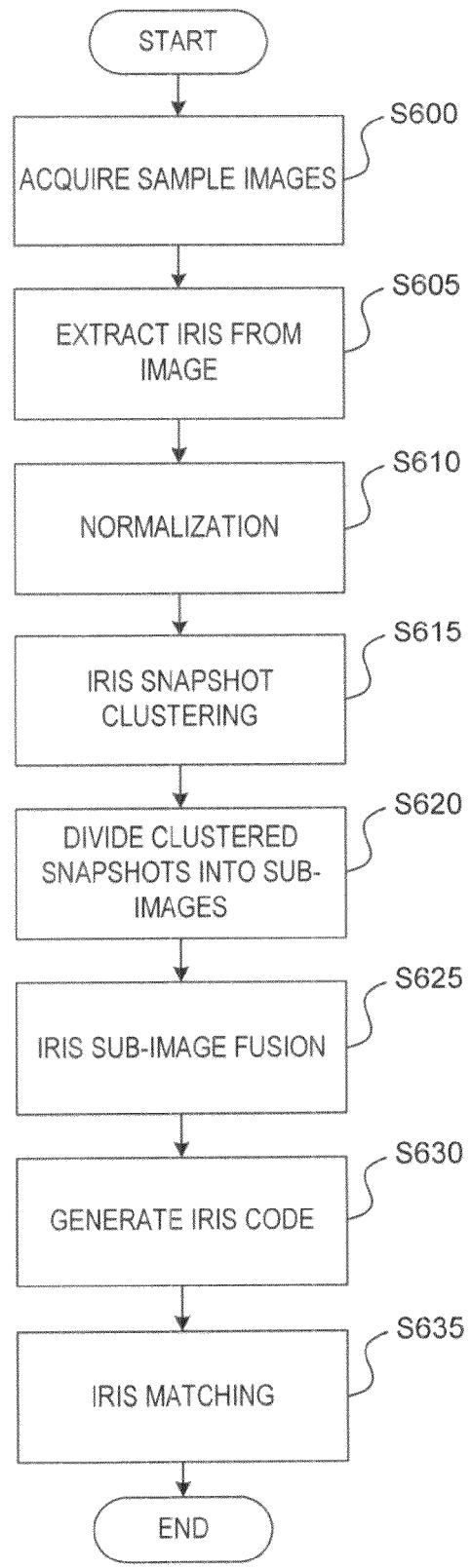
FIG. 6 illustrates a non-limiting exemplary flowchart for iris analysis according to one aspect of the present disclosure.

Next, FIG. 6 illustrates an exemplary algorithmic flowchart for performing iris analysis based on image fusion according to one aspect of the present disclosure. Referring to the figure, the iris analysis device 100 at step S600 acquires a plurality of iris sample images. In one aspect of the present disclosure, the sample images are acquired via a camera included in the peripherals 518. In other aspects of the present disclosure, the sample images may be acquired from a database in communication with the iris analysis device 100 via the network 50. As a non-limiting example of a database from which iris sample images may be acquired, the CASIA iris image database may provide iris sample images to the iris analysis device 100 in response to a request query signal. In further aspects of the present disclosure, the sample images may be a combination of images captured in real-time (e.g., at a border control station) and images stored in advance in a database.

Figure 7:
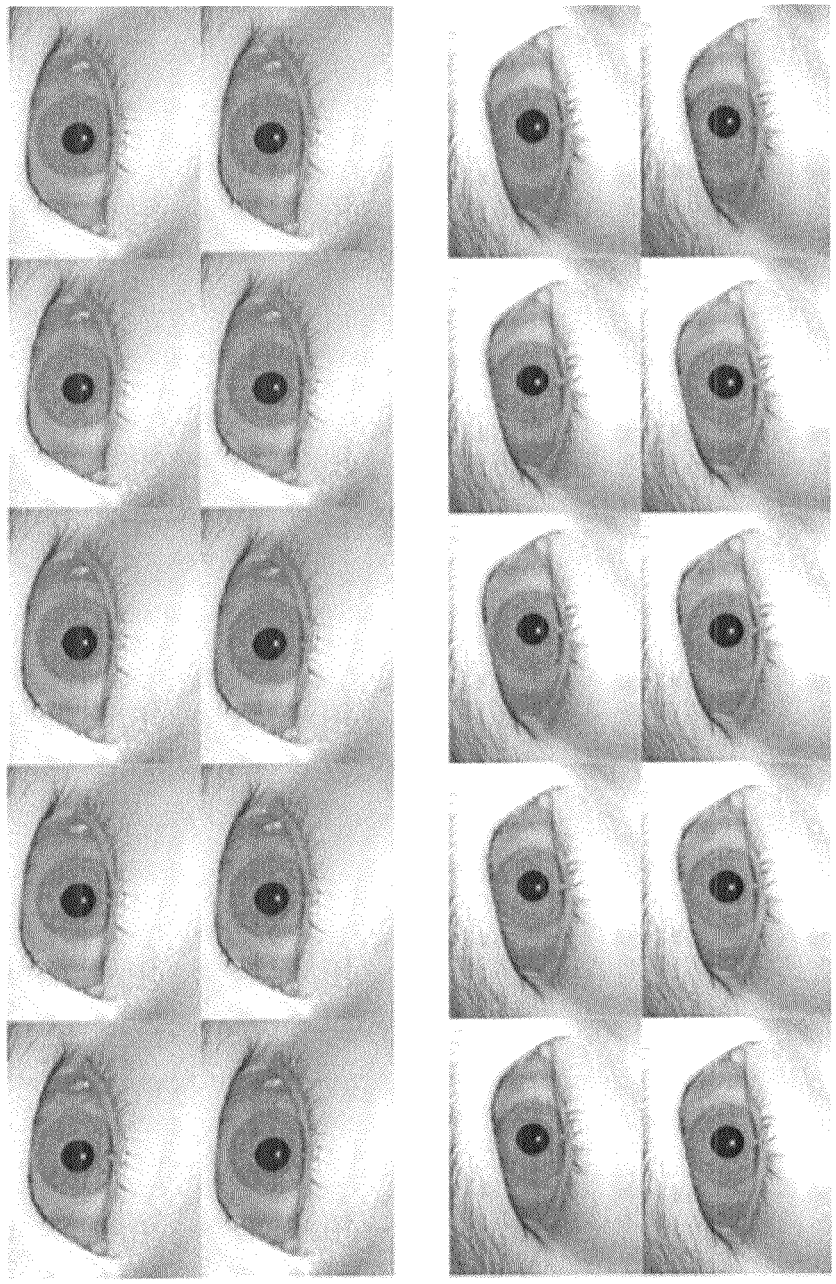
FIG. 7 illustrates an exemplary set of acquired iris images according to one aspect of the present disclosure.

It should be noted that a high quantity iris image sample set may be preferred and therefore, the iris recognition apparatus according to the present disclosure may acquire a multitude of images at step S600, even if these images are acquired at high sample frequency at substantially the same sample time. For example, a high-speed camera may capture a plurality of images in a single authentication session (e.g., at a single "scan" at a border control checkpoint). As a further example, moving image video data may be analyzed such that an iris sample image may be acquired for a plurality of frames in the video data. Moreover, the image sample set may be a combination of stored images captured across time (e.g., images from multiple instances in which an individual's identity is verified at an access control checkpoint). Therefore, in certain embodiments, many sources of iris image samples may be available to the iris analysis device 100 via communication across the network 50. For example, multiple border control checkpoints at a plurality of dispersed geographic areas may be linked such that stored iris image sample data may be shared. The benefits of having a large pool of sample images that iris recognition processing according to the present disclosure may acquire and utilize include addressing issues related to poor image capture at the time of acquisition (e.g., shadowing, blocking iris with eyelid or eyelash, low quality image capture processors, blurring, etc.). As a non-limiting example of a set of iris images obtained at step S600, FIG. 7 illustrates an exemplary sample of iris images for left and right eyes obtained from the MIRLIN database.

Next, referring back to FIG. 6, the iris analysis device 100 at steps S605 and S610 performs iris sample image pre-processing functions of segmentation/extraction and normalization, respectively.

Referring to step S605, the iris analysis device 100 extracts the iris image region from the plurality of iris sample images acquired at S600. In certain aspects of the present disclosure, this step may include identifying the iris boundary and noise. In order to do that, first the iris (i.e., outer boundary with the sclera) and pupil (i.e., inner boundary) are localized. In one aspect of the present disclosure, this localization step may be done using a Hough transform and edge detection to calculate the exact parameters of outer and inner circles forming the iris. The main strength of Hough transform in detecting shapes in images is that it is not affected by noise or gabs in the shape. Following localization, the noise is identified—namely, eyelid, eyelashes and other irrelevant part of the iris including lighting noise.

At step S610, the iris analysis device 100 performs normalization processing. In one aspect of the present disclosure, Daugman's Rubber sheet model may be used to normalize the iris by remapping each point within the iris region to a pair of polar coordinates $(r, \theta)$, where r is on the interval $[0,1]$ and $\theta$ is angle $[0,2\pi]$.

Figure 8:
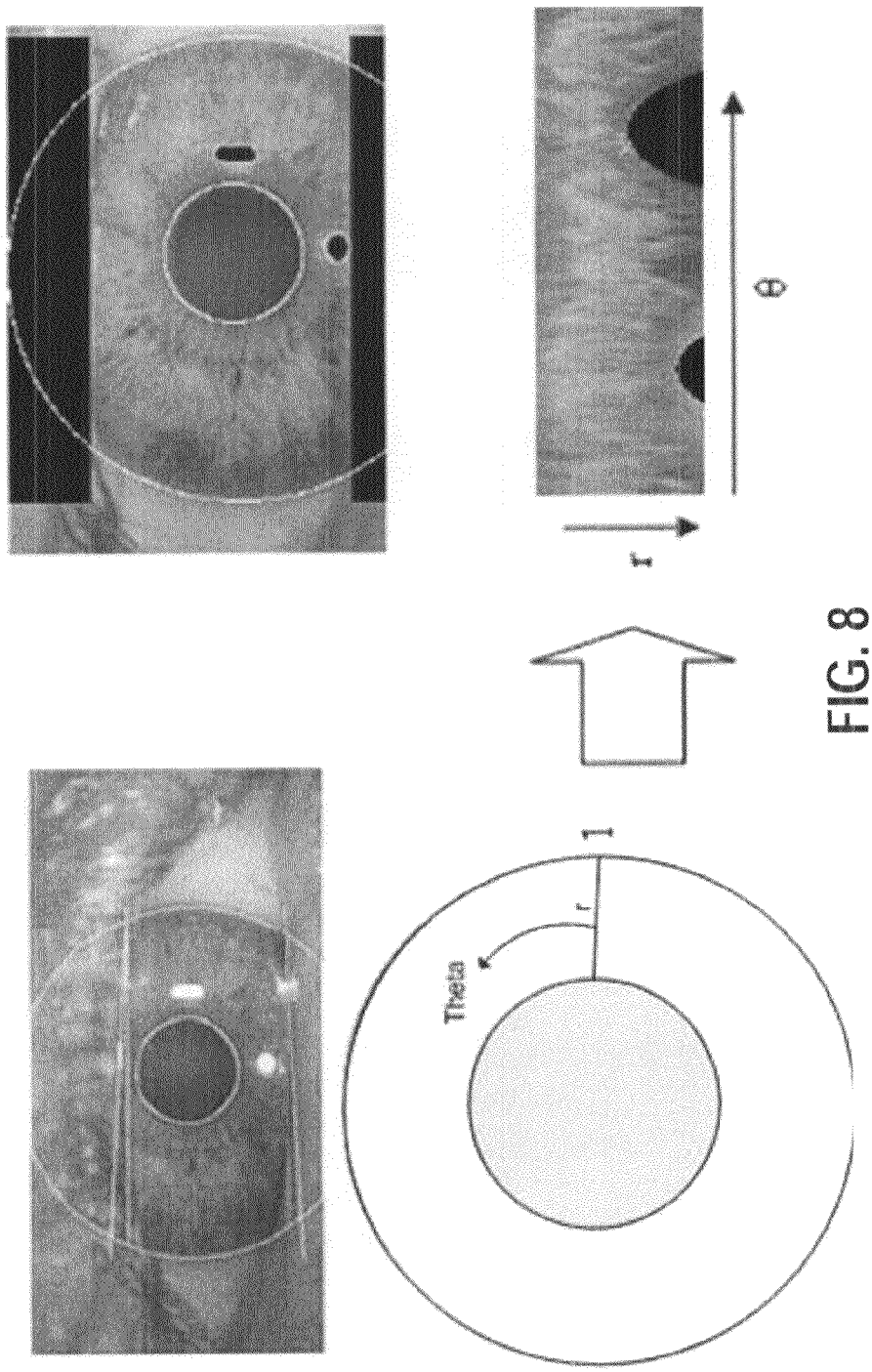
FIG. 8 illustrates non-limiting exemplary features of a normalization process according to one aspect of the present disclosure.

FIG. 8 illustrates exemplary features of a normalization process according to one aspect of the present disclosure.

In the iris fusion module the normalized iris image is divided into sub-images from a set of multiple images from the same iris. Each sub-image may be treated as a texture (i.e., a pattern), and a perfect match for that texture may be retrieved from the set of iris images. The retrieval process is described in later paragraphs. The normalized image is then reconstructed from the best texture in all sub-images.

Referring back to FIG. 6, following normalization, the iris analysis device 100 at step S615 performs iris snapshot clustering processing. In certain aspects of the present disclosure, the plurality of extracted and normalized images may be partitioned into clusters at step S615 based on a comparison of image features. In a non-limiting example, the iris analysis device 100 may perform processing based on k-means clustering, whereby clusters are formed based on a calculated mean. In another non-limiting example, the iris analysis device 100 may perform processing based on Hamming distance to form the image clusters. The skilled artisan will appreciate that the clusters may be formed based on other factors corresponding to image similarity and/or other image features, and the aforementioned examples are in no way limiting.

In the example of performing processing based on Hamming distance, or other quantitative analysis techniques, similarities between iris images may be measured via a Hamming distance calculation (or other appropriate mathematical model), which was discussed above, and the clusters may be formed based on predetermined thresholds of Hamming distance values (or other quantitative measurements related to image similarity). Iris images falling within one or more clusters below/above a predetermined threshold value may be selected for subsequent processing. Consequently, rather than performing processing on every acquired and/or stored iris image, the iris analysis device 100 selects only the iris images that meet certain tolerances for quality with which to perform subsequent processing, thereby improving both processing efficiency and iris recognition accuracy.

In certain aspects of the present disclosure, clustering may be performed in cases in which the images acquired at step S600 share a common identity or wherein multiple individual identities are represented in the acquired images. In the case where the images share a common identity, the clustering acts as a filter to ensure the top quality images are utilized in subsequent processing. In the case where the identities are mixed and/or unknown, the clustering processing forms image clusters based on similarities such that the likelihood of images within a cluster having a common identity increases, thereby improving subsequent iris recognition/matching processing accuracy.

In certain aspects of the present disclosure, sub-clusters of iris images may be formed within the image clusters resultant from the processing of step S615. For example, the iris analysis device 100 may select the iris image cluster with the highest degree of similarity (e.g., the lowest average Hamming distance). Based on the selected cluster, the iris analysis device 100 may further partition the iris images within the cluster into a plurality of sub-clusters. For example, if the cluster having the highest degree of relative similarity between iris images includes greater than a predetermined number of images, the iris analysis device 100 may form a plurality of sub-clusters such that the sub-clusters include less than another predetermined number of images. The iris analysis device 100 may then select the sub-cluster of the highest degree of relative similarity, and output the sub-cluster for subsequent processing, thereby further improving processing efficiency by ensuring the subsequent processing is applied to a minimum sufficient quantity of images.

Next, the iris analysis device 100 at step S620 divides each iris image included in the cluster of images into a plurality of sub-images. In certain embodiments, the iris analysis device 100 retrieves a first image included in a cluster (or sub-cluster) of iris images generated at step S615. The iris analysis device 100 then divides the retrieved images into a predetermined number of sub-images. For example, the retrieved image may be divided into twelve sub-images. The sub-images may be of substantially the same size, or they may be of varied sizes. Each sub-image in the divided image represents a texture. Sub-images for each of the iris images included in the corresponding cluster of iris images may be similarly divided to obtain sub-image textures. In certain embodiments, the number of sub-images formed for each image is the same for each iris image in the cluster of images. The number of sub-images into which a given iris image is divided may be based on the desired level of accuracy for a given application, as well as the processing capacity available.

Figure 9:
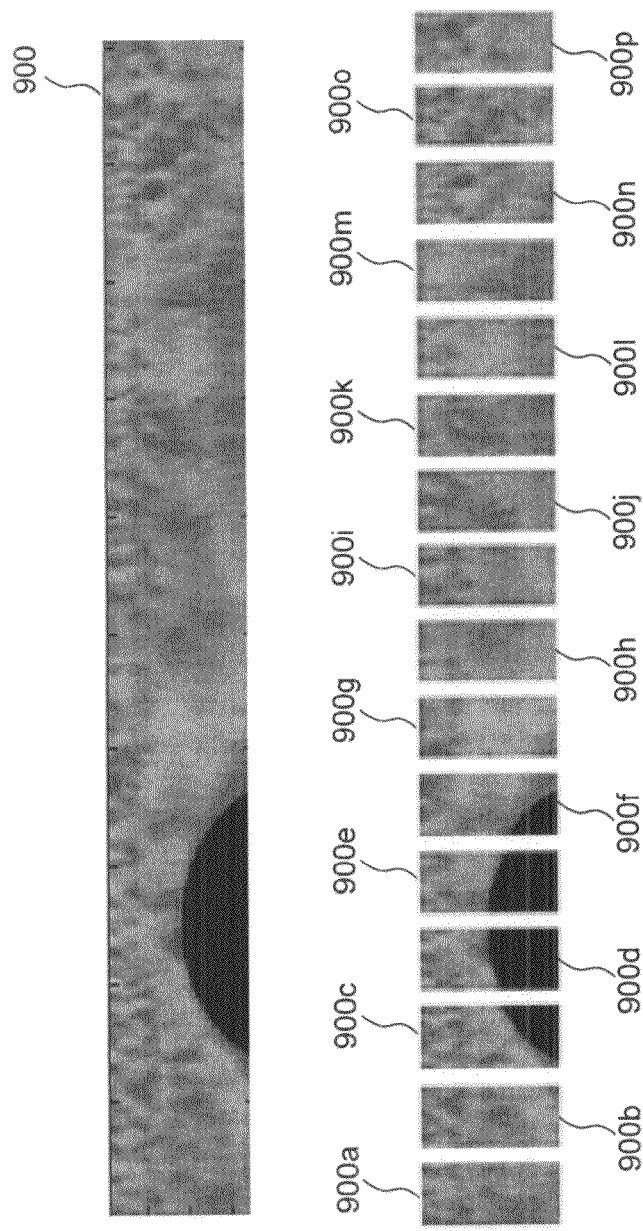
FIG. 9 illustrates a non-limiting example of dividing an iris image into a plurality of sub-images according to one aspect of the present disclosure.

FIG. 9 illustrates a non-limiting example of dividing an iris image into a plurality of sub-images. Referring to FIG. 9, an iris image 900 is acquired, e.g., as one of the iris images included in a cluster generated in step S615. The iris image 900 is divided into a predetermined number of sub-images, which are each treated as a texture. In the example of FIG. 9, the iris image 900 is divided into 16 sub-images. In certain embodiments, the iris analysis device 100 may perform processing on corresponding sub-images across some or all of the complete iris images included in the cluster. For example, the first sub-image (e.g., sub-image 900a) may be analyzed with respect to every corresponding first sub-image for all images included in a cluster (i.e., every sub-image in the first sub-image block position). Based on the analysis, the sub-image exhibiting, e.g., the highest correlation to a model/base sub-image may be selected. This processing may continue for each sub-image block (e.g., for the second through sixteenth sub-image block in FIG. 9) such that a single sub-image corresponding to each block position is selected for the iris images in the cluster.

Figure 10:
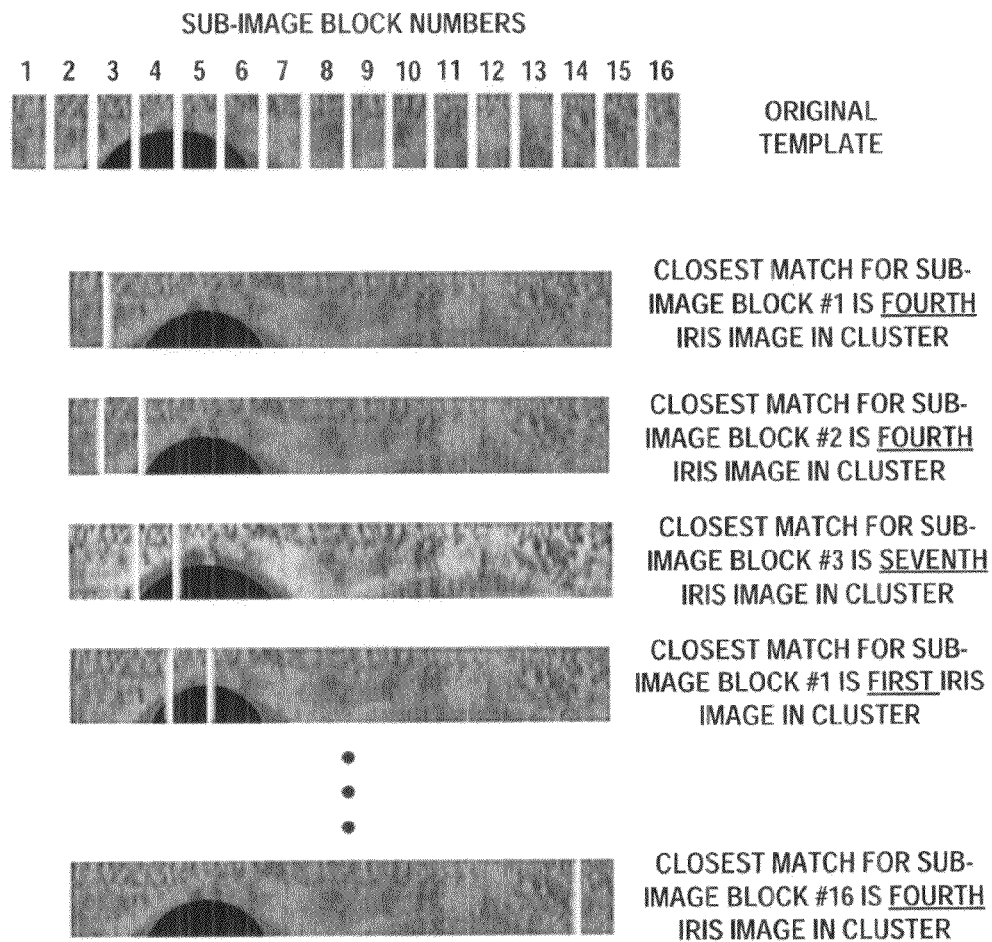
FIG. 10 illustrates a non-limiting example of sub-image selection according to one aspect of the present disclosure.

FIG. 10 illustrates a non-limiting example of a sub-image selection processing according to certain embodiments of the present disclosure. Referring to FIG. 10, an original template image is divided into a plurality of sub-images. Additionally, a cluster of iris images is retrieved, and each of the images included in the cluster is divided into the same number of sub-images as the original template. In this example, 8 iris images are included in the cluster, and each image in the cluster is divided into 16 sub-images (represented in the figure as block #1-1). The iris analysis device 100 sequentially performs matching analysis processing for each sub-image block position to determine the closest sub-image match from the cluster with respect to the corresponding sub-image block in the original template. For example, if there are n sub-images, the iris analysis device 100 performs the matching analysis processing on the sub-images corresponding to sub-image block #1, of the sub-images in the cluster of images, to determine which of the sub-images in that block position most closely matches sub-image #1 in the original template. This processing continues for each sub-image block up to #n. In the illustrative example of FIG. 10, the iris analysis device 100 performs the matching analysis processing by comparing the eight sub-images in block #1 with sub-image #1 in the original template, and determines the sub-image iris image #4, of the acquired cluster, best matches sub-image #1 in the original template. The iris analysis device 100 stores the matching sub-image in memory, and the processing continues for each sub-image block position. The result, in this non-limiting example, is sixteen sub-images most closely matching their corresponding sub-image in the original template are stored in memory.

Figure 11:
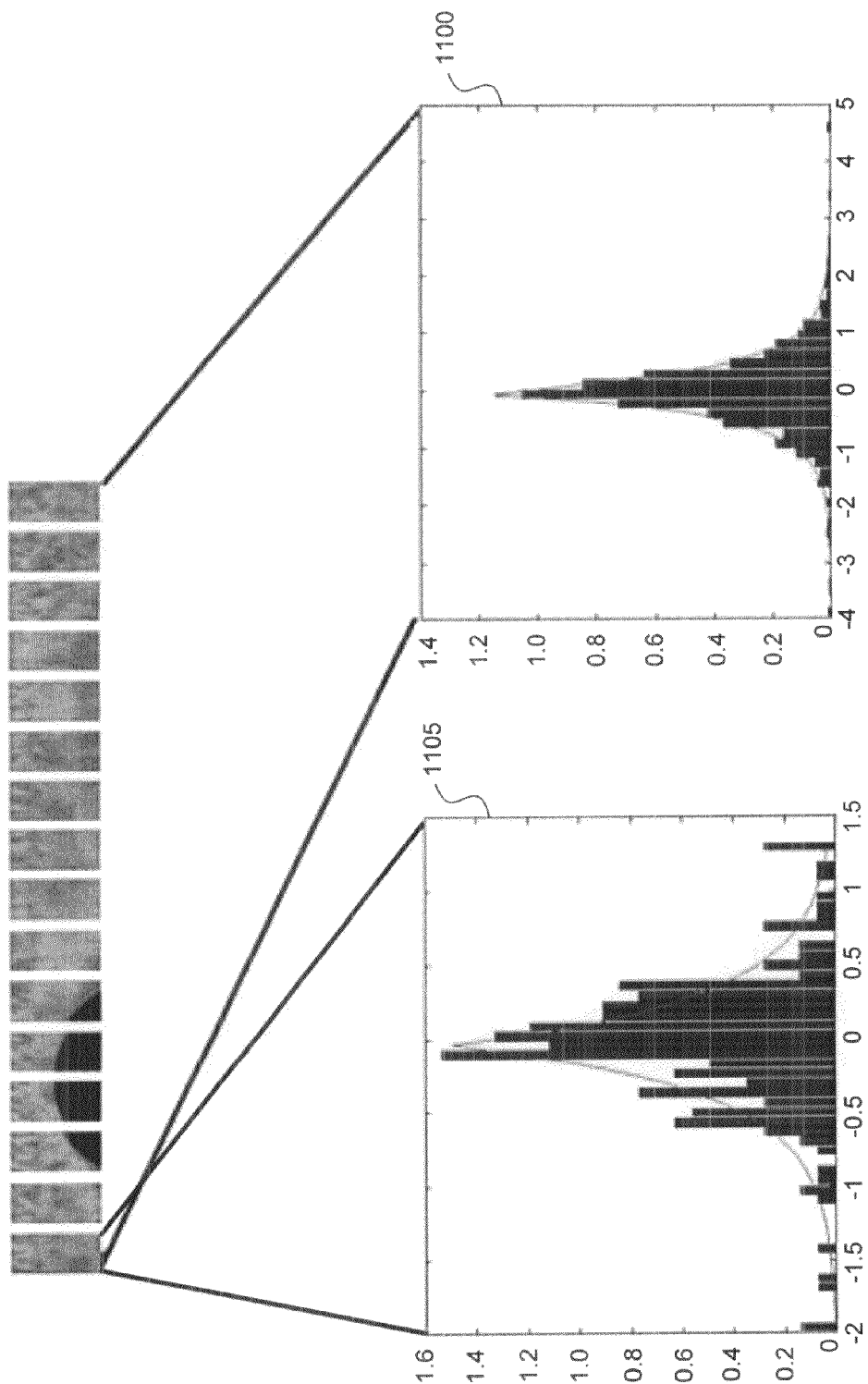
FIG. 11 illustrates non-limiting exemplary features of sub-image selection according to one aspect of the present disclosure.

As a non-limiting example of comparison processing performed at step S620, FIG. 11 illustrates a non-limiting example of a sample GGD of a complete iris image (e.g., iris image 900), and a sample GGD of a sub-image (e.g., sub-image 900a). Referring to FIG. 11, graph 1100 illustrates an exemplary graphical result of transforming the complete iris image corresponding to the sub-images into the DWT domain, and modeling the transformed textures using a GGD model. In this example, Maximum-Likelihood (ML) estimator was utilized in generating the GGD model. Graph 1105 illustrates an exemplary graphical result of transforming a single sub-image into the DWT domain, and modeling the transformed texture using a GGD model. Similar to graph 1100, graph 1105 was also generated using ML estimator. In certain embodiments, the iris analysis device 100 estimates the coefficients $\alpha$ and $\beta$ to construct the feature vectors using the ML estimation algorithm for the GGD coefficients. In certain embodiments, using the GGD of each sub-image, the optimum match for each sub-image may be determined based on the Kullback-Leibler Distance (KLD), whereby the closest matching sub-image (e.g., the sub-image having the lowest (KLD)) is selected and stored in memory for later processing.

Next, referring back to FIG. 6, the iris analysis device 100 at step S625 fuses the sub-images selected in step S620 to form a normalized composite iris image. In the example discussed above of utilizing KLD, the sub-image of the plurality of sub-images corresponding to the same block position having the lowest KLD is selected, and the iris analysis device 100 reconstructs a complete iris image by fusing the selected sub-images. As a result, a complete composite iris image having improved quality with respect to a captured iris image representing one instant in time may be realized. For example, the aforementioned processing may replace sub-images having, e.g., high noise levels or image interference, with corresponding sub-images captured at a different time in which such image features are not present or are present to a lesser degree, thereby improving the effectiveness in subsequent iris recognition processing.

Next, the iris analysis device 100 at step S630 generates an IrisCode from the composite iris image generated in step S625. In certain embodiments, the generation of the IrisCode, which is the feature extracted from the iris, is produced by convolving the normalized iris region of the composite iris image with 1D Log-Gabor filters, and then the phase components are quantized in order to produce a bit-wise biometric template. In order to do this, the 2D normalized iris is isolated into a number of 1D signals, and then these 1D signals are convolved with 1D Gabor wavelet. The rows of the 2D normalized iris are considered as the 1D signals, and each row denotes a singular ring of the iris region. The angular direction which corresponds to the columns of the normalized pattern is used instead of choosing the radial one since the maximum independence occurs in the angular direction. In order to prevent influence of noise in the output of the filtering, the intensity values are set at known noise areas in the normalized pattern to the average intensity of the surrounding pixels. After that, in certain embodiments, the Daugman method is applied to the output of filtering to produce four levels by phase quantization. Each filter produces two bits of data for each phasor. This encoding process using the Daugman algorithm and Gabor filters produces a bitwise template containing a number of bits of information, and a corresponding noise mask which corresponds to corrupt areas within the iris pattern, and marks bits in the template as corrupt [25].

Next, the iris analysis device 100 at step S635 performs iris matching based on the composite iris image. In certain embodiments, the generated IrisCode from step S630 may be matched against a set of stored IrisCode(s) or may be matched against IrisCode(s) generated/acquired in substantially real-time. In certain embodiments, the stored IrisCode(s) may be inter-class templates and intra-class templates. In certain embodiments, the comparison between two IrisCodes may be done using Hamming distance. In this case, only the bits in the IrisCode that correspond to '0' bits in the noise masks of both iris patterns are calculated. Ideally, two IrisCodes from the same iris should give a Hamming distance of zero, but in practice this will not occur. This happens because of the noise differences in each iris and the normalization process being imperfect. To deal with misalignments in iris between different iris images, the Daugman method may, in certain embodiments, be implemented by shifting the IrisCode left and right bit-wise, and a number of Hamming distance values are calculated from successive shifts and the lowest is taken. A failure of statistical independence between two templates would result in a match. That is, the two templates are deemed to have been generated from the same iris.

Figure 12A:
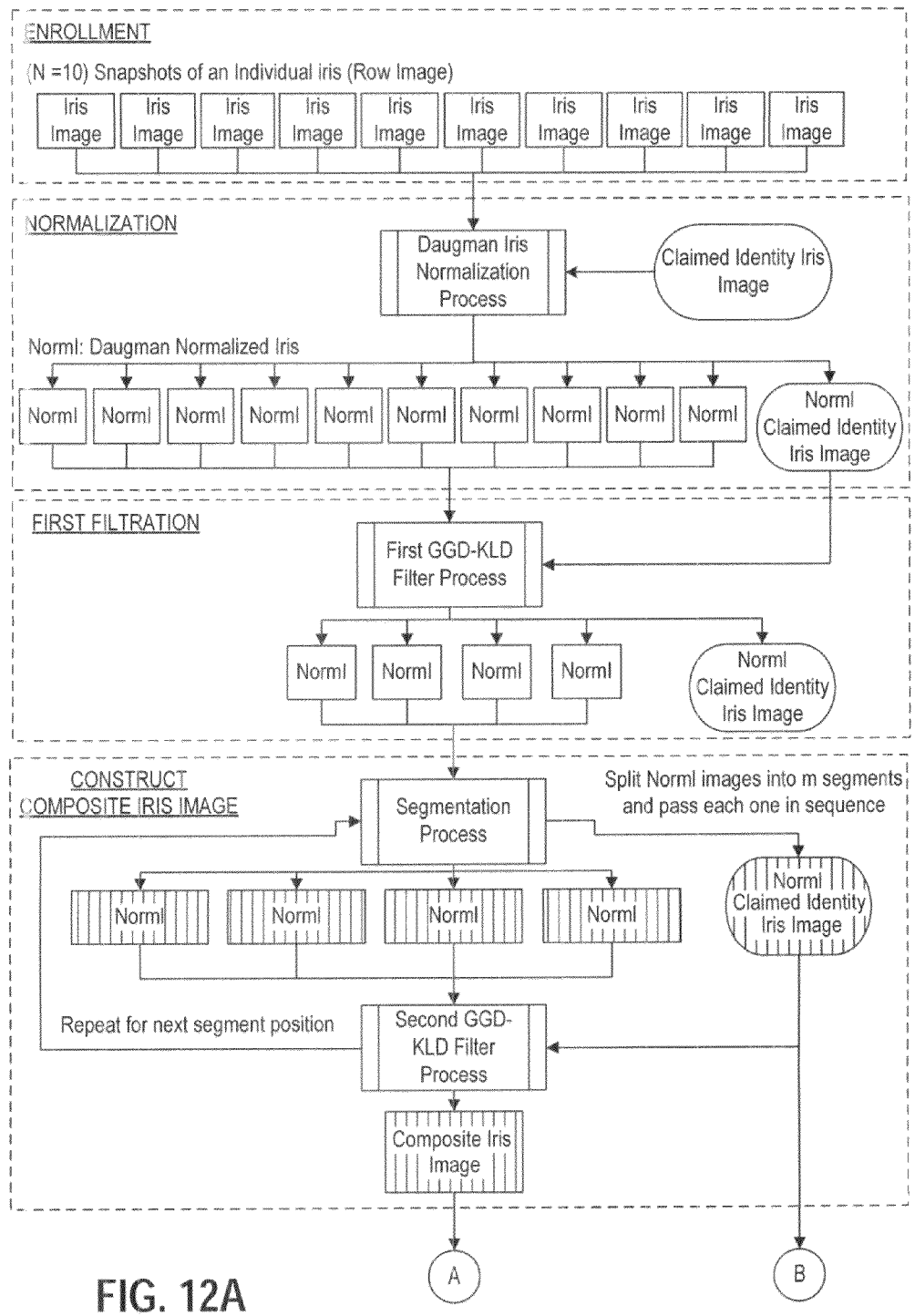
FIGS. 12A and 12B illustrate an exemplary flow diagram of a process for identity authentication, according to certain embodiments.
Figure 12B:
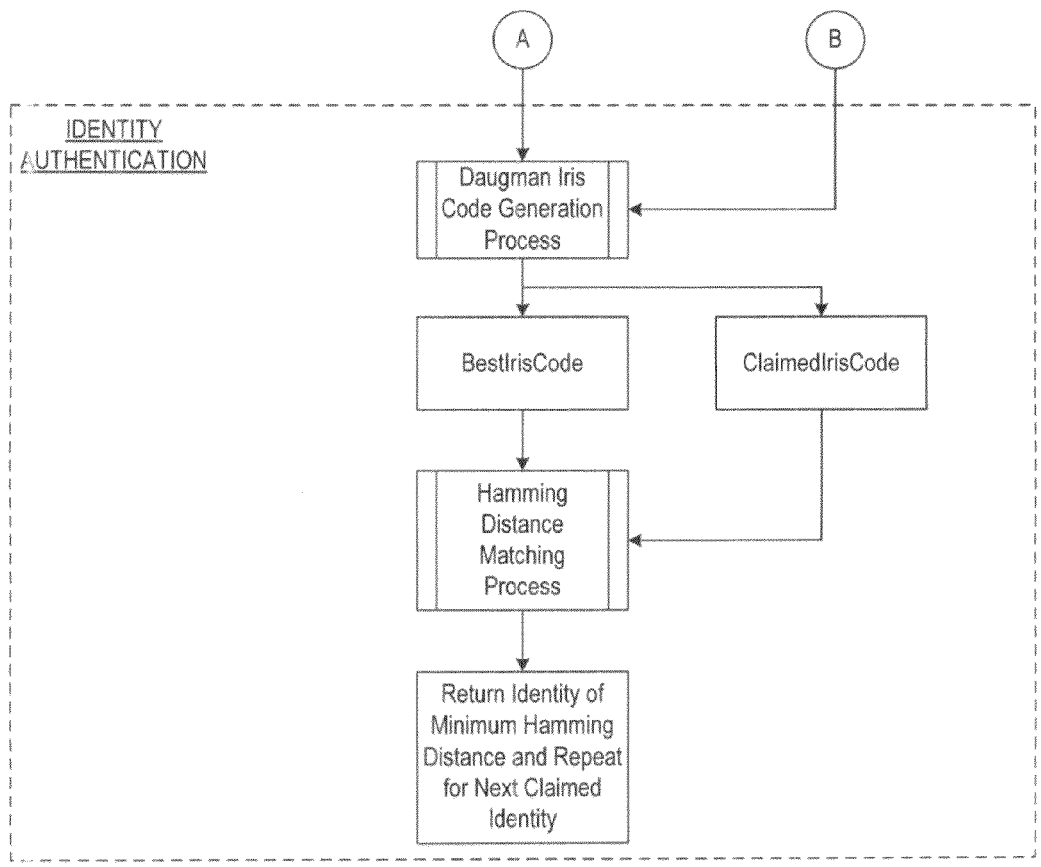

Next, FIGS. 12A and 12B illustrate an exemplary flow diagram of a process for identity authentication, according to certain embodiments.

Referring first to FIG. 12A, the exemplary process begins in an enrollment phase. In the enrollment phase, a plurality of snapshots (ten in this example) are captured or received of a given individual, wherein the snapshots include at least one of the individual's eyes. Extraction techniques such as those described previously may be applied to extract the iris from the snapshots, resulting in a plurality of iris images (again, ten in this example). The iris images may be stored locally in storage medium (e.g., memory 502), or may be stored remotely on a server connected to a network (e.g., network 50). In this phase, each image could also be captured separately in multiple visits or in multiple locations with various imaging sensors (e.g., a charged coupled device for moving or still images), or the images in the enrollment phase may be captured and processed at substantially the same time.

Referring now to the normalization phase, at a different time than when the images in the enrollment phase are captured or received, an eye image corresponding to an individual whose identity is to be authenticated is captured or received, and the iris portion of this image is extracted (i.e., the "claimed identity iris image" in FIG. 12A). Although FIG. 12A illustrates the receiving of the claimed identity image as being within the normalization process and subsequent to the enrollment process, this is not limiting. For example, a stored image that is captured before the enrollment phase images are received may be utilized as the claimed identity iris image when performing identity authentication.

Referring still to the normalization phase, the plurality of iris images from the enrollment phase and the claimed identity iris image are normalized. In certain embodiments, a Daugman iris normalization process may be applied to normalize the iris images. A set of normalized iris images ("norml" in FIG. 12A) are output from the normalization process. Additionally, a normalized claimed identity iris image ("norml claimed identity iris image" in FIG. 12A) is output. The normalized images are then received as inputs in a first filtration phase.

In the first filtration phase, a filtration process is applied to the plurality of normalized iris images (norml) to select a subset of images that best correspond to the claimed identity iris image. In certain embodiments, the filtration process in the first filtration phase is a GOD-KLD filtration process. For example, a GGD-KLD filter is applied to the plurality of normalized iris images to select the normalized iris images that best represent the normalized claimed identity iris image. Four images are selected in FIG. 12A, but this number is not limiting. In this step, each normalized image is modeled using Generalized Gaussian Distributions (GGD) and compared to the model of the other normalized images using Kullback-Leibler Distance (KLD). The iris analysis device 100 then selects the subset of images that have the minimum KLD (e.g., the four norml images output from the first filtration process in FIG. 12A).

Next, a "perfect" composite iris image is constructed using the subset of filtered normalized iris images. In this phase, each filtered and normalized iris image of the subset of images is divided into a predetermined number of sub-images. Additionally, the normalized claimed identity iris image is divided into the same number of segments as each of the subset of normalized eye pictures. In select embodiments, the sub-image sizes are equal in each of the segmented iris images. In other embodiments, the sub-image sizes may be different; however, sub-images of corresponding positions (e.g., the first sub-image position in each segmented iris image) is of the same size. FIG. 12A illustrates various blocks representing image data in the exemplary flow diagram as being "divided" into sub-images. However, this illustration is not representative of any aspect of the manner in which sub-images are formed (e.g., the quantity, size, etc. of the sub-images).

After dividing each filtered and normalized iris image into a plurality of sub-images, sub-images corresponding to the first sub-image position in each image are input to a second filtration process. In certain embodiments, the second filtration process utilizes a GGD-KLD filter. For example, assuming each filtered and normalized image is divided into ten sub-images m1 through m10, the iris analysis device 100 analyzes sub-image m1 from each segmented normalized image and passes the sub-images m1 of each filtered and normalized iris image through the second GGD-KLD filter to select the sub-image that best matches the sub-image m1 corresponding to the segmented and normalized claimed identity eye picture. This process is repeated for each sub-image from m1 to m10 to obtain the 10 best segments with which to form the "perfect" composite iris. In certain embodiments, the composite iris image is formed by fusing the selected sub-images to generate a new iris image. The composite image may be stored in a local storage medium (e.g., memory 50) or may be output for storage on a server via a network (e.g., network 50).

Following the generation of the composite iris image, the iris analysis device 100 now has a normalized composite iris image (i.e., the composite includes a plurality of normalized image segments) that may be treated as a normalized image when input to a Daugman iris code generation process, which is shown beginning in FIG. 12B. FIG. 12B illustrates an authentication phase that includes the Daugman iris code generation process. Using Daugman coding, the iris analysis device 100 generates an IrisCode for the normalized composite iris image ("BestIrisCode") and for the normalized claimed identity iris image ("ClaimedIrisCode") and compares the generated codes using Hamming distance. The resultant Hamming distance is stored as a minimum match value and its corresponding identity (i.e., the identity corresponding to the image having the lowest Hamming distance) is said to be the claimed identity until another set of iris images generates a lower Hamming distance. That is, the above-described process is repeated until no more identities to compare with in the system and the identity with lowest Hamming distance is returned as an authenticated identity.

The above-described identity authentication process provides multiple benefits in terms of improved performance with respect to authenticating that a claimed identity image is a suitable match to an identity corresponding to stored images obtained in an enrollment process. First, efficiency is improved relative to a process whereby, e.g., clustering is performed without the claimed identity image. For example, if clustering of iris images is performed without prior knowledge about the claimed identity, the resultant output produces a lot of noise, thereby decreasing system performance. However, if an algorithm such as that in FIGS. 12A and 12B is performed with a normalized claimed identity iris image, the results are improved in terms of the data being related to the identity being claimed and not just clustered amongst themselves (e.g., based on the intrinsic attributes of the data received by the system).

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising circuitry configured to: receive a plurality of images, wherein each of the plurality of images includes at least one iris; extract, from each of the plurality of images, the at least one iris image included in the image; receive a claimed identity iris image, wherein the claimed identity iris image corresponds to an identity to be authenticated based on the extracted iris images; normalize the extracted iris images and the claimed identity iris image; filter, in a first filtration process, the normalized extracted iris images to select a subset of the normalized extracted iris images, wherein the subset of the normalized extracted iris images are selected based on a similarity measurement between each of the normalized extracted iris images relative to the normalized claimed identity iris image; divide the normalized claimed identity iris image and each image of the subset of the normalized extracted iris images into a plurality of sub-images, wherein each of the plurality of sub-images is assigned a sub-image position indicating an ordered position of the sub-image within the sub-image's corresponding divided image; filter, as a second filtration process, the sub-images in a same sub-image position across all the sub-image positions corresponding to the normalized extracted iris images to select the sub-image having a closest similarity measurement relative to a sub-image of the normalized claimed identity image that is in a corresponding sub-image position to the selected sub-image; and generate a composite iris image by fusing the sub-images selected in the second filtration process.

(2) The apparatus of (1), wherein the first filtration process filters the images based on a Generalized Gaussian Distribution (GGD) and Kullback-Leibler distance (KLD) analysis.

(3) The apparatus of (1) or (2), wherein the extracted iris images and the claimed identity iris image are normalized based on a Daugman iris normalization process.

(4) The apparatus of any one of (1) to (3), wherein a quantity of sub-images corresponding to each image of the subset of the normalized extracted iris images is the same as a quantity of sub-images corresponding to the normalized claimed identity iris image.

(5) The apparatus of any one of (1) to (4), wherein the second filtration process filters the sub-images based on a Generalized Gaussian Distribution (GGD) and Kullback-Leibler distance (KLD) analysis.

(6) The apparatus of any one of (1) to (5), wherein the circuitry is further configured to generate an IrisCode for the composite iris image and the normalized claimed identity iris image.

(7) The apparatus of any one of (1) to (6), wherein the circuitry is configured to: compare the IrisCode of the composite iris image and the IrisCode of the normalized claimed identity iris image; and output an identity authentication result based on the comparison of IrisCodes.

(8) The apparatus of any one of (1) to (7), wherein the circuitry is configured to: compare the IrisCodes based on a Hamming distance calculation; and a positive identity authentication result is output when the calculated Hamming distance is below a predetermined threshold.

(9) The apparatus of any one of (1) to (8), further comprising a memory, wherein the result of the Hamming distance calculation is stored in the memory as a minimum Hamming distance value.

(10) The apparatus of any one of (1) to (9), wherein the circuitry is configured to: compare the IrisCodes based on a Hamming distance calculation; store the result of the Hamming distance calculation in a memory as a minimum Hamming distance value; and update the stored minimum Hamming distance value when a subsequent comparison between the IrisCode of the normalized claimed identity iris image and an IrisCode of another composite image results in a lower Hamming distance value than the currently stored minimum Hamming distance value being calculated.

(11) A method comprising: receiving, by circuitry, a plurality of images, wherein each of the plurality of images includes at least one iris; extracting, by the circuitry, from each of the plurality of images, the at least one iris image included in the image; receiving, by the circuitry, a claimed identity iris image, wherein the claimed identity iris image corresponds to an identity to be authenticated based on the extracted iris images; normalizing, by the circuitry, the extracted iris images and the claimed identity iris image; filtering, by the circuitry in a first filtration process, the normalized extracted iris images to select a subset of the normalized extracted iris images, wherein the subset of the normalized extracted iris images are selected based on a similarity measurement between each of the normalized extracted iris images relative to the normalized claimed identity iris image;

dividing, by the circuitry, the normalized claimed identity iris image and each image of the subset of the normalized extracted iris images into a plurality of sub-images, wherein each of the plurality of sub-images is assigned a sub-image position indicating an ordered position of the sub-image within the sub-image's corresponding divided image; filtering, by the circuitry as a second filtration process, the sub-images in a same sub-image position across all the sub-image positions corresponding to the normalized extracted iris images to select the sub-image having a closest similarity measurement relative to a sub-image of the normalized claimed identity image that is in a corresponding sub-image position to the selected sub-image; and generating, by the circuitry, a composite iris image by fusing the sub-images selected in the second filtration process.

(12) The method of (11), wherein the first filtration process and the second filtration process filter the images based on a Generalized Gaussian Distribution (GGD) and Kullback-Leibler distance (KLD) analysis.

(13) The method of (11) or (12), wherein the extracted iris images and the claimed identity iris image are normalized based on a Daugman iris normalization process.

(14) The method of any one of (11) to (13), wherein a quantity of sub-images corresponding to each image of the subset of the normalized extracted iris images is the same as a quantity of sub-images corresponding to the normalized claimed identity iris image.

(15) The method of any one of (11) to (14), further comprising generating, by the circuitry, an IrisCode for the composite iris image and the normalized claimed identity iris image.

(16) The method of any one of (11) to (15), further comprising comparing, by the circuitry, the IrisCode of the composite iris image and the IrisCode of the normalized claimed identity iris image; and outputting, by the circuitry, an identity authentication result based on the comparison of IrisCodes.

(17) The method of any one of (11) to (16), further comprising comparing, by the circuitry, the IrisCodes based on a Hamming distance calculation, wherein a positive identity authentication result is output when the calculated Hamming distance is below a predetermined threshold.

(18) The method of any one of (11) to (17), further comprising storing, by the circuitry, the result of the Hamming distance calculation in a memory as a minimum Hamming distance value.

(19) The method of any one of (11) to (18), further comprising: comparing, by the circuitry, the IrisCodes based on a Hamming distance calculation; storing, by the circuitry, the result of the Hamming distance calculation in a memory as a minimum Hamming distance value; and updating, by the circuitry, the stored minimum Hamming distance value when a subsequent comparison between the IrisCode of the normalized claimed identity iris image and an IrisCode of another composite image results in a lower Hamming distance value than the currently stored minimum Hamming distance value being calculated.

(20) A non-transitory computer readable medium having instructions stored therein that when executed by one or more processors cause the one or more processors to perform a method of image analysis, the method comprising: receiving a plurality of images, wherein each of the plurality of images includes at least one iris; extracting, from each of the plurality of images, the at least one iris image included in the image; receiving a claimed identity iris image, wherein the claimed identity iris image corresponds to an identity to be authenticated based on the extracted iris images; normalizing the extracted iris images and the claimed identity iris image; filtering, as a first filtration process, the normalized extracted iris images to select a subset of the normalized extracted iris images, wherein the subset of the normalized extracted iris images are selected based on a similarity measurement between each of the normalized extracted iris images relative to the normalized claimed identity iris image; dividing the normalized claimed identity iris image and each image of the subset of the normalized extracted iris images into a plurality of sub-images, wherein each of the plurality of sub-images is assigned a sub-image position indicating an ordered position of the sub-image within the sub-image's corresponding divided image; filtering, as a second filtration process, the sub-images in a same sub-image position across all the sub-image positions corresponding to the normalized extracted iris images to select the sub-image having a closest similarity measurement relative to a sub-image of the normalized claimed identity image that is in a corresponding sub-image position to the selected sub-image; and generating a composite iris image by fusing the sub-images selected in the second filtration process.

The invention claimed is:
1. An apparatus comprising
circuitry configured to:
  receive a plurality of images, wherein each of the plurality of images includes at least one iris;
  extract, from each of the plurality of images, the at least one iris image included in the image;
  receive a claimed identity iris image, wherein the claimed identity iris image corresponds to an identity to be authenticated based on the extracted iris images;
  normalize the extracted iris images and the claimed identity iris image;
  filter, in a first filtration process, the normalized extracted iris images to select a subset of the normalized extracted iris images, wherein the subset of the normalized extracted iris images are selected based on a similarity measurement between each of the normalized extracted iris images relative to the normalized claimed identity iris image;
  divide the normalized claimed identity iris image and each image of the subset of the normalized extracted iris images into a plurality of sub-images, wherein each of the plurality of sub-images is assigned a sub-image position indicating an ordered position of the sub-image within the sub-image's corresponding divided image;
  filter, as a second filtration process, the sub-images in a same sub-image position across all the sub-image positions corresponding to the normalized extracted iris images to select the sub-image having a closest similarity measurement relative to a sub-image of the normalized claimed identity image that is in a corresponding sub-image position to the selected sub-image; and
  generate a composite iris image by fusing the sub-images selected in the second filtration process
wherein the first filtration process filters the images based on a Generalized Gaussian Distribution (GGD) and Kullback-Leibler distance (KLD) analysis; and
wherein the second filtration process Filters the sub-images based on a Generalized Gaussian Distribution (GGD) and Kullback-Leibler distance (KLD) analysis.

2. The apparatus of claim 1, wherein
the extracted iris images and the claimed identity iris image are normalized based on a Daugman iris normalization process.

3. The apparatus of claim 1, wherein
a quantity of sub-images corresponding to each image of the subset of the normalized extracted iris images is the same as a quantity of sub-images corresponding to the normalized claimed identity iris image.

4. The apparatus of claim 1, wherein
the circuitry is further configured to generate an IrisCode for the composite iris image and the normalized claimed identity iris image.

5. The apparatus of claim 4, wherein
the circuitry is configured to:
compare the IrisCode of the composite iris image and the IrisCode of the normalized claimed identity iris image; and
output an identity authentication result based on the comparison of IrisCodes.

6. The apparatus of claim 5, wherein
the circuitry is configured to:
compare the IrisCodes based on a Hamming distance calculation; and
a positive identity authentication result is output when the calculated Hamming distance is below a predetermined threshold.

7. The apparatus of claim 6, further comprising
a memory, wherein
the result of the Hamming distance calculation is stored in the memory as a minimum Hamming distance value.

8. The apparatus of claim 5, wherein
the circuitry is configured to:
compare the IrisCodes based on a Hamming distance calculation;
store the result of the Hamming distance calculation in a memory as a minimum Hamming distance value; and
update the stored minimum Hamming distance value when a subsequent comparison between the IrisCode of the normalized claimed identity iris image and an IrisCode of another composite image results in a lower Hamming distance value than the currently stored minimum Hamming distance value being calculated.

9. A method comprising:
receiving, by circuitry, a plurality of images, wherein each of the plurality of images includes at least one iris;
extracting, by the circuitry, from each of the plurality of images, the at least one iris image included in the image;
receiving, by the circuitry, a claimed identity iris image, wherein the claimed identity iris image corresponds to an identity to be authenticated based on the extracted iris images;
normalizing, by the circuitry, the extracted iris images and the claimed identity iris image;
filtering, by the circuitry in a first filtration process, the normalized extracted iris images to select a subset of the normalized extracted iris images, wherein the subset of the normalized extracted iris images are selected based on a similarity measurement between each of the normalized extracted iris images relative to the normalized claimed identity iris image;
dividing, by the circuitry, the normalized claimed identity iris image and each image of the subset of the normalized extracted iris images into a plurality of sub-images, wherein each of the plurality of sub-images is assigned a sub-image position indicating an ordered position of the sub-image within the sub-image's corresponding divided image;
filtering, by the circuitry as a second filtration process, the sub-images in a same sub-image position across all the sub-image positions corresponding to the normalized extracted iris images to select the sub-image having a closest similarity measurement relative to a sub-image of the normalized claimed identity image that is in a corresponding sub-image position to the selected sub-image; and
generating, by the circuitry, a composite iris image by fusing the sub-images selected in the second filtration process
wherein the first filtration process filters the images based on a Generalized Gaussian Distribution (GGD) and Kullback-Leibler distance (KLD) analysis; and
wherein the second filtration process filters the sub-images based on a Generalized Gaussian Distribution (GGD) and Kullback-Leibler distance (KLD) analysis.

10. The method of claim 9, wherein
the extracted iris images and the claimed identity iris image are normalized based on a Daugman iris normalization process.

11. The method of claim 9, wherein
a quantity of sub-images corresponding to each image of the subset of the normalized extracted iris images is the same as a quantity of sub-images corresponding to the normalized claimed identity iris image.

12. The method of claim 9, further comprising
generating, by the circuitry, an IrisCode for the composite iris image and the normalized claimed identity iris image.

13. The method of claim 12, further comprising:
comparing, by the circuitry, the IrisCode of the composite iris image and the IrisCode of the normalized claimed identity iris image; and
outputting, by the circuitry, an identity authentication result based on the comparison of IrisCodes.

14. The method of claim 13, further comprising
comparing, by the circuitry, the IrisCodes based on a Hamming distance calculation, wherein
a positive identity authentication result is output when the calculated Hamming distance is below a predetermined threshold.

15. The method of claim 14, further comprising
storing, by the circuitry, the result of the Hamming distance calculation in a memory as a minimum Hamming distance value.

16. The method of claim 13, further comprising:
comparing, by the circuitry, the IrisCodes based on a Hamming distance calculation;
storing, by the circuitry, the result of the Hamming distance calculation in a memory as a minimum Hamming distance value; and
updating, by the circuitry, the stored minimum Hamming distance value when a subsequent comparison between the IrisCode of the normalized claimed identity iris image and an IrisCode of another composite image results in a lower Hamming distance value than the currently stored minimum Hamming distance value being calculated.

17. A non-transitory computer readable medium having instructions stored therein that when executed by one or more processors cause the one or more processors to perform a method of image analysis, the method comprising:
receiving a plurality of images, wherein each of the plurality of images includes at least one iris;
extracting, from each of the plurality of images, the at least one iris image included in the image;

receiving a claimed identity iris image, wherein the claimed identity iris image corresponds to an identity to be authenticated based on the extracted iris images;

normalizing the extracted iris images and the claimed identity iris image;

filtering, as a first filtration process, the normalized extracted iris images to select a subset of the normalized extracted iris images, wherein the subset of the normalized extracted iris images are selected based on a similarity measurement between each of the normalized extracted iris images relative to the normalized claimed identity iris image;

dividing the normalized claimed identity iris image and each image of the subset of the normalized extracted iris images into a plurality of sub-images, wherein each of the plurality of sub-images is assigned a sub-image position indicating an ordered position of the sub-image within the sub-image's corresponding divided image;

filtering, as a second filtration process, the sub-images in a same sub-image position across all the sub-image positions corresponding to the normalized extracted iris images to select the sub-image having a closest similarity measurement relative to a sub-image of the normalized claimed identity image that is in a corresponding sub-image position to the selected sub-image; and generating a composite iris image by fusing the sub-images selected in the second filtration process wherein the second filtration process filters the sub-images based on a Generalized Gaussian Distribution (GGD) and Kullback-Leibler distance (KLD) analysis; and wherein the second filtration process filters the sub-images based on a Generalized Gaussian Distribution (GGD) and Kullback-Leibler distance (KLD) analysis.

* * * * *